Oct. 17, 1939.　　　W. W. WOOD　　　2,176,780

SPRING SUSPENSION DEVICE

Filed Aug. 12, 1937

Inventor

Walter W. Wood

By Frazer and Bishop

Attorneys

Patented Oct. 17, 1939

2,176,780

UNITED STATES PATENT OFFICE 2,176,780

SPRING SUSPENSION DEVICE

Walter W. Wood, Canton, Ohio

Application August 12, 1937, Serial No. 158,699

3 Claims. (Cl. 280—52)

The invention relates to a spring suspension device for mounting wheels upon vehicles and is especially adapted for use upon agricultural implements and the like in which body springs are not usually provided.

The object of the invention is to provide a spring suspension device in which the wheel is so mounted that it will assist the driving power in riding over an obstacle in the path of the wheel.

A further object is to provide a device of this kind in which the wheel is mounted upon an axle carried at the lower end of a bracket pivoted at a higher point to the frame of the vehicle, the axle being located at a point below and to the rear of the pivot point, spring means being provided for urging the lower end of the pivoted bracket forward and permitting it to swing backward and upward upon its pivot when an obstacle is encountered in the path of the vehicle.

Another object is to provide means for varying the spring tension upon the bracket as may be required by the load upon the vehicle or other conditions.

Figure 2:
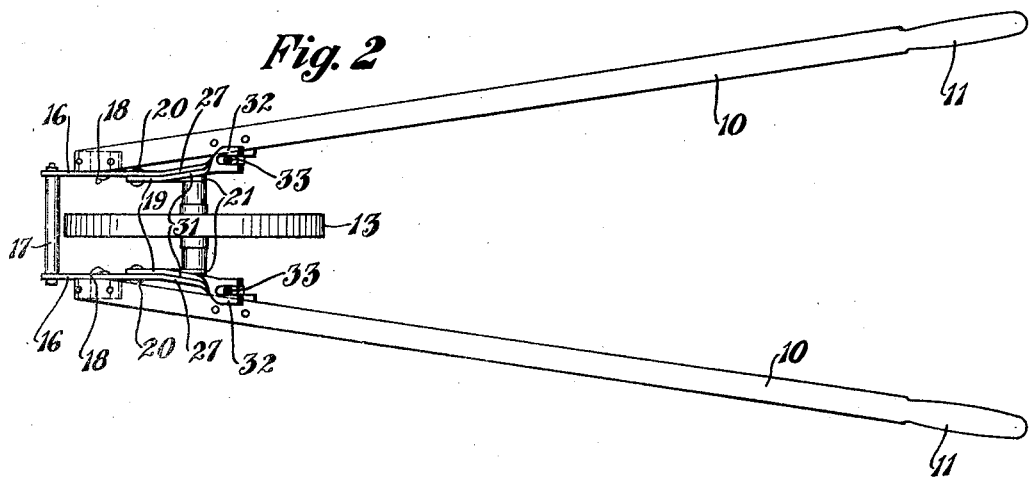
Figure 1:
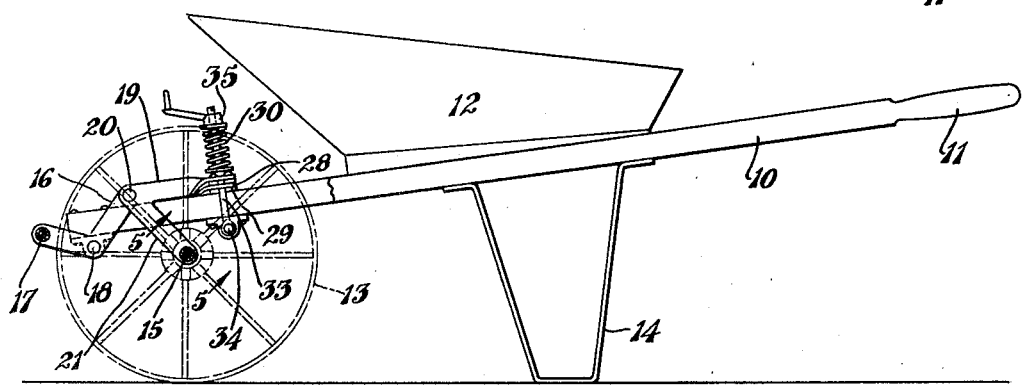
Figure 3:
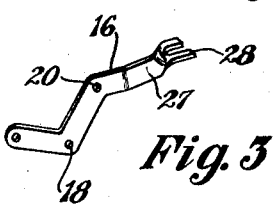
Figure 4:
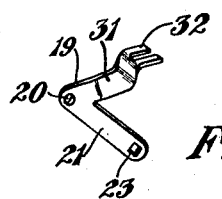

The above objects together with others which will be apparent from the drawing and following description or which may be later referred to may be attained by constructing the improved spring suspension in the manner illustrated in the accompanying drawing, in which Figure 1 is a sectional elevation of a wheelbarrow showing the improved spring suspension device for mounting the wheel thereof;

Fig. 2, a top plan view of the wheelbarrow shown in Fig. 1 with the bed or body removed;

Fig. 3, a detail perspective of one of the primary levers;

Fig. 4, a similar view of one of the secondary levers; and

Figure 5:
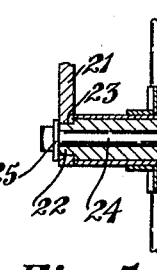

Fig. 5, an enlarged sectional view taken as on the line 5—5, Fig. 1.

Similar numerals refer to similar parts throughout the drawing.

Although it should be understood that the improved spring suspension to which the invention pertains may be used on any kind of wheeled vehicle or the like having any number of wheels, for the purpose of illustration the invention is shown in the drawing as applied to the single wheel of a wheelbarrow.

The wheelbarrow may be provided with the usual frame comprising the diverging side bars 10 having handles 11 formed at their rear ends and having a bed or body 12 of any usual and well known design fixed thereon.

The usual single wheel 13 is adapted to be mounted at the forward end of the frame by means of the improved spring suspension device to which the invention pertains, as will be later described, and suitable rests or legs 14 of any usual and well known construction may depend from the side bars 10 of the frame to cooperate with the wheel 13 for supporting the wheelbarrow in upright position upon the ground or other substantially horizontal surface when at rest, as shown in Fig. 1.

The wheel 13 is carried upon an axle 15, mounted upon the pivoted bracket construction to which the invention pertains. For this purpose a pair of primary brackets 16, as shown in detail in Fig. 3, may be pivotally mounted upon the frame of the vehicle. These brackets, as illustrated, may be rigidly tied together at their forward ends, as by the crossbar 17, and are pivoted to the side bars 10, at points intermediate their ends, as indicated at 18.

The secondary brackets 19, shown in detail in Fig. 4, are in the form of bell crank levers, pivoted as at 20 to the primary brackets 16, at points spaced above and to the rear of the pivot points 18. The depending, rearwardly disposed legs 21, of these bell crank levers, are rigidly connected to the wheel axle 15, which may be tubular as shown in Fig. 5, the reduced, squared ends 22 thereof being received in similarly squared apertures 23 in the legs 21, a tie bolt 24, with washers 25 and nut 26 being located through the hollow axle for clamping the legs 21 rigidly thereon.

Each of the brackets 16 has a rearwardly disposed leg 27, beyond the pivotal point 20, terminating in the bifurcated end 28, adapted to be urged into contact with a bumper 29, upon the adjacent side bar 10, as by a spring 30.

The rearwardly disposed leg 31, of each of the bell crank brackets 19 terminates in the flattened, bifurcated end 32, adapted to contact the end 28 of the corresponding primary bracket, and the rod 33, which is pivoted to the corresponding side bar 10, at its lower end, as at 34, is located through said bifurcated ends, and has a nut 35 at its upper end for adjusting the spring 30 which is located around said rod between the nut and the end 32 of the bracket 19.

It will thus be seen that the wheel is carried by the brackets 19 which are pivoted upon the brackets 16, which in turn are pivoted upon the frame of the vehicle, and the springs 30 urge both sets of brackets toward the normal position and permit relative movement of the brackets 19 and 16, as well as movement of the latter relative to the side frames 14.

In propelling the vehicle forwardly, if an obstacle upon the ground is encountered, the axle will swing rearwardly and upwardly, around the centers 18 or 20, or both, flexing the springs 30, and permitting the wheel to ride over the obstacle more easily than is possible with a rigidly mounted wheel axle, since the pivoted spring suspension assists the driving power, whether manual or mechanical, in riding over obstacles.

To better understand the principle made use of in this invention and the manner of operation thereof, the unsprung wheel of an ordinary wheelbarrow may be used as an illustration. In such case the axle of the wheel is journaled in bearings rigidly connected to the frame.

As the wheel strikes an obstacle the line of reaction passes through the contact point of the wheel with the obstacle and through the center of the wheel axle in a rearwardly and upwardly disposed oblique line. If this line be taken as representing the force of the reaction, then the vertical component extending straight upward from the center of the axle and the horizontal component extending straight backward therefrom are equivalent to this force of the reaction.

The vertical component is a deflecting force, as it acts at right angles to the direction of travel, and the wheel may therefore yield to it by rising and surmounting the obstacle. The horizontal component, however, acts in the direction opposite to the direction of travel, and since the wheel cannot yield in that direction, this force must be absorbed as shock, i. e., dissipated in the forms of heat and mechanical abrasion.

In most of the current forms of spring suspensions the device is such that the spindle or axle can move relatively to the frame of the vehicle only in a direction substantially vertical, which is at right angles to the roadway and to the direction of the vehicle's motion. Such is the case in the common form of leaf spring much used in automobiles. The motion permitted the axle or spindle relative to the frame approximates an arc about the pivot at the front end of the spring as a center, and that part of this arc covered by the come-and-go of the axle is substantially vertical.

In such design the horizontal component still has to be absorbed as shock. In the case of automobiles the situation is modified by the use of pneumatic tires, but, although this slows down the rate of development of impact, the horizontal component still must be dissipated in the forms of heat and/or mechanical abrasion.

Therefore, it appears desirable to reduce the effect of shock and wear by cushioning the horizontal component. This calls for a design of axle mounting such that the change of position of the wheel with relation to the frame under impact from an obstacle will have a horizontal as well as a vertical element; i. e., the wheel may recede as well as lift with respect to the frame.

Many different mechanical arrangements which will permit such a motion may be designed, but, for the purpose of constructive analysis, attention is called to the construction illustrated in British patent to Jubb, No. 426,986 of April 12, 1935. The axle or spindle A is joined to the frame by an oblique link D with spring means P to hold the parts in normal position when at rest or in undisturbed motion on the road. It is clear that if a horizontal retarding force be impressed on the axle, while the momentum of the frame is propelling the pivot G of the link D forward, the pivot G will tend to rotate about the axle as a center and conversely the axle will tend to rotate about pivot G as a center, the pivot G swinging downward and the axle A swinging upward. These rotating tendencies act to lift the wheel over the obstacle and to pull down on the frame at the very instant when it is receiving the upward impulse from the vertical component.

The neutralizing effect exerted on the upthrust by utilizing the horizontal component in this manner, is of considerable significance. The fault in this particular design, however, becomes apparent when we analyze the effect of the vertical component. If the vertical component itself be resolved into components, one acting tangentially to the permitted arc of travel of A about G, and the other at right-angles to it, it will be apparent that this second component is unsprung and will be transmitted longitudinally along the link and impressed on the frame at G as shock. This unrelieved shock disqualifies such a design.

Applicant's construction, using the compound linkage comprises the primary bracket 16 and the secondary bracket 21 pivoted thereto at 20, the horizontal component acts primarily about the secondary pivot 20 but also about the primary pivot 18. It will be observed that the lever arm of the horizontal component about the secondary pivot 20 is greater than about the primary pivot 18. But the vertical component has its greater lever arm about the primary pivot 18 and a shorter one about the secondary pivot 20 so that it tends to act primarily about the primary pivot 18.

The functional effectiveness of this mechanism may be more clearly understood by considering the following: the reaction from an obstacle is not instantaneous, but, starting at the instant of impact, when its force is at maximum, continues, its force decreasing the while, until the wheel is atop the obstacle, at which point the reactive force ceases, or becomes equal to zero. The direction of the reaction-line at any instant, of course, corresponds with the line which passes through the effective contact point (of wheel with obstacle) and through the center of the spindle. It is now to be noted that as the wheel surmounts the obstacle the direction of the reaction-line shifts from its initial position progressively toward the vertical and that as the wheel reaches the top position the reaction-line reaches the vertical.

In the scientific designing of a spring-cushion mechanism, it is essential that the sprung part shall yield most easily in the direction of the applied force, i. e., the path of least resistance of the sprung part should correspond with the direction of the applied force, and since in the case of a vehicle wheel passing over an obstacle the direction of the applied force changes constantly throughout the duration of its application, this fact must be recognized in the design of a suitable cushioning mechanism.

Note that in the present design the spindle, in yielding to the reactive force, is free to rotate about either the primary pivot 18 or secondary pivot 20 or about both simultaneously, but the parts are so proportioned that in the case of a comparatively large obstacle the initial reactive force has a greater lever arm about the secondary pivot 20 than about the primary pivot 18, and the spindle will therefore start to rotate about the secondary pivot. But, as the wheel mounts the obstacle the direction of the reaction-line shifts toward the vertical and this change of direction results in a change in relative lever-arm lengths which after a certain point gives a greater lever-arm length about the primary pivot 18 than about the secondary pivot 20. Rotational motion will now be about the primary pivot, the direction of the path of the spindle having changed to accord with the changing direction of the reactive-force. In the case of a minor obstacle the lever-arm at the instant of impact may already be greater about the primary pivot 18 than about the secondary pivot 20, in which case no separate motion as about the secondary pivot will occur.

A further factor affecting the change in lever-arm lengths is to be noted: rotation about the secondary pivot 20 increases the actual distance from the primary pivot 18 to the spindle. This causes a change in relative lever-arm lengths which is in addition to the change caused by the shifting direction of the reaction-line.

In this design rotation may occur about both pivots at the same time or about either independently. Obviously the spindle will always move in the direction of least resistance, or the direction of easiest yield. If this direction does not conform with the line of applied force, an unsprung component will be present which must be absorbed as shock. But as we have already seen, the direction of applied force, in the case of a vehicle wheel passing over an obstacle, changes as the wheel mounts the obstacle. The characteristic of the present design which we have here attempted to described may be summarized by saying that the direction of easiest yield, of the spindle, changes more or less in conformity with the changing direction of the reaction-line, keeping shock-loss at a minimum throughout the duration of the occurrence of the reactive force.

I claim:

1. In combination with a vehicle frame, a primary bracket pivoted upon the frame, a secondary bracket pivoted upon the primary bracket and having an arm depending below the primary bracket, an axle carried by the lower portion of said arm, a wheel upon said axle, a rearwardly disposed arm upon the primary bracket, a rearwardly disposed arm upon the secondary bracket, and spring means for urging both of said rearwardly disposed arms downwardly.

2. In combination with a vehicle frame, a primary bracket pivoted upon the frame, a secondary bracket pivoted upon the primary bracket and having an arm depending below the primary bracket, an axle carried by the lower portion of said arm, a wheel upon said axle, a rearwardly disposed arm upon the primary bracket adapted to contact with the top of the frame, a rearwardly disposed arm upon the secondary bracket adapted to contact with the top of the first named rearwardly disposed arm, and spring means for urging both of said rearwardly disposed arms downwardly.

3. In combination with a vehicle frame, a primary bracket pivoted upon the frame and extending rearwardly from the pivot point, a secondary bracket pivoted upon the primary bracket intermediate the ends of the primary bracket and having an arm depending below the primary bracket, an axle carried by the lower portion of said arm, a wheel upon said axle, a rearwardly disposed arm upon the secondary bracket, and spring means for urging said rearwardly disposed arm and the rear end of the primary bracket downwardly.

WALTER W. WOOD.